No. 767,608. Patented August 16, 1904.

UNITED STATES PATENT OFFICE.

HENDRICKS P. STRAHAN, OF PERRY, OKLAHOMA TERRITORY.

PROCESS OF SILVERING OR RESILVERING GLASS.

SPECIFICATION forming part of Letters Patent No. 767,608, dated August 16, 1904.

Application filed September 3, 1903. Serial No. 171,814. (No specimens.)

*To all whom it may concern:*

Be it known that I, HENDRICKS P. STRAHAN, a citizen of the United States, residing at Perry, in county of Noble and Territory of Oklahoma, have invented certain new and useful Improvements in Processes of Silvering or Resilvering Glass; and I do declare the following to be a full, clear, and exact description of the invention, such as will enable others skilled in the art to which it appertains to make and use the same.

My invention relates to a process of silvering or resilvering glass in the production or restoration of mirrors. Its object is to provide a process and silvering composition by means of which mirrors may be quickly manufactured and old mirrors restored or resilvered and to provide for the application of the composition in the fluid condition by coating and without the use of pressure or other methods of application involving the use of special machinery or skilled labor.

By my process the operation of silvering a glass or resilvering old glasses may be readily and conveniently effected without the use of machinery or skilled labor and at a minimum expenditure of time and labor and at a comparatively low cost for materials.

In carrying my invention into practice I first prepare a silvering solution, which may be termed "solution No. 1," by adding eighty grains of nitrate of silver to a pint of distilled water and dropping therein a suitable quantity of concentrated ammonia. The ammonia is added drop by drop until the solution turns a milky color and then clears up like water. This solution is allowed to stand from eight to ten hours, when it is filtered and ready for use. I then form a salt solution by adding sixty grains of Rochelle salts to a pint of distilled water, filter the same, and bottle for use. Finally, a sizing or protective coating is made by incorporating two parts of Japan sizing with one part of asphaltum.

In the process of treatment the glass to be used is washed, then laid on a level surface, exposed to sunlight, and finally washed over with concentrated ammonia in order to remove anything liable to interfere with the proper coating of the silvering material. The silvering material is then prepared by mixing equal parts of solutions No. 1 and No. 2 in the proportions of three ounces to each square foot of glass surface. The edge of the glass is next coated with wax and the solution poured upon the glass, the same being held from running off by the wax until the silvering matter is precipitated. After a time the back of the glass turns a dark gray, and the coating becomes hardened and is ready for the final treatment, which consists in applying the sizing thereto by means of a brush and allowing the sizing to dry, when the work is accomplished. The result of this mode of treatment is that a mirror-surface of fine quality is produced at the expenditure of very little time and labor and at a fraction of the cost of the ordinary treatment. The operation of resilvering after removal of the old coating is carried out in the same way.

Having thus described my invention, what I claim, and desire to secure by Letters Patent, is—

The herein-described process of silvering or resilvering glass, consisting in forming a silvering solution composed of eighty grains of nitrate of silver to a pint of water, adding concentrated ammonia drop by drop until the solution turns a milky color and then clears up, forming a salt solution composed of sixty grains of Rochelle salts to a pint of water; then initially cleansing the surface of the glass; laying the glass on a level surface exposed to sunlight; washing the glass with concentrated ammonia; forming a rim around the edge of the glass; preparing the silvering material by mixing equal parts of the silvering and salt solutions and pouring the same upon the exposed surface of the same within the rim; leaving the same exposed to sunlight until dry; and then applying to the dried silvering material a protective coating of Japan sizing and asphaltum, substantially as described.

In testimony whereof I have hereunto set my hand in presence of two subscribing witnesses.

HENDRICKS P. STRAHAN.

Witnesses:
S. P. STRAHAN,
J. S. CLIFTON.